Nov. 3, 1959     T. G. BRUNSMAN     2,911,100
CLOG PROOF FILTER
Filed Oct. 17, 1956     2 Sheets-Sheet 1
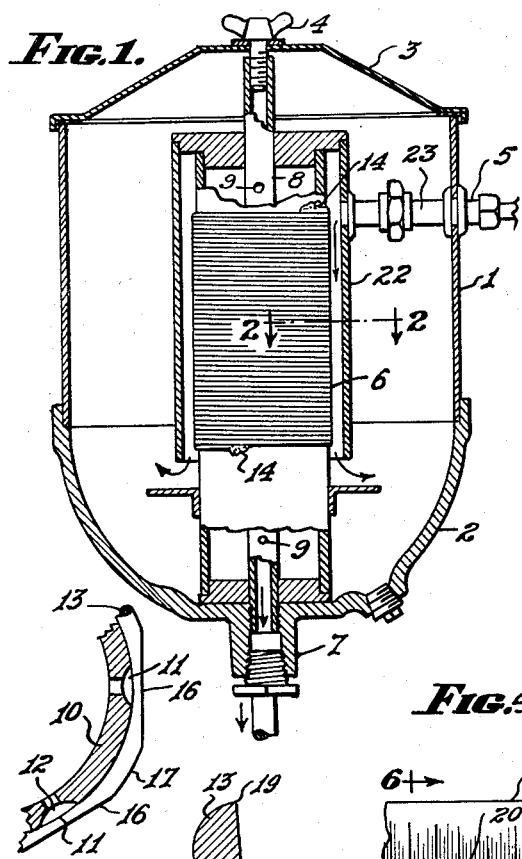
FIG. 1.
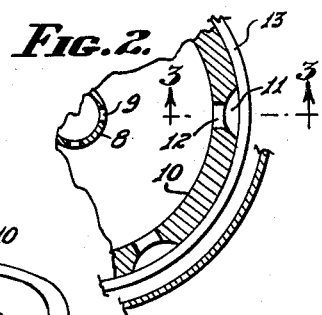
FIG. 2.
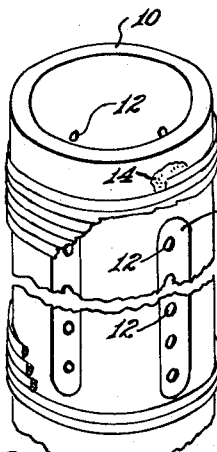
FIG. 4.
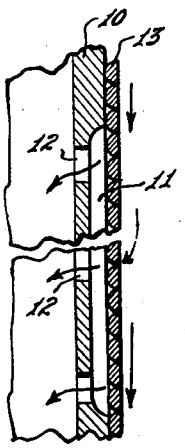
FIG. 3.
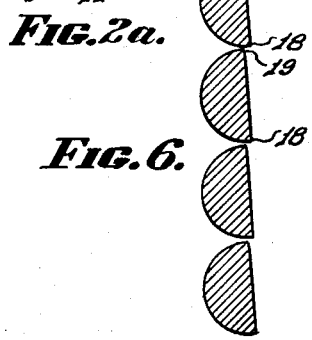
FIG. 2a.
FIG. 6.
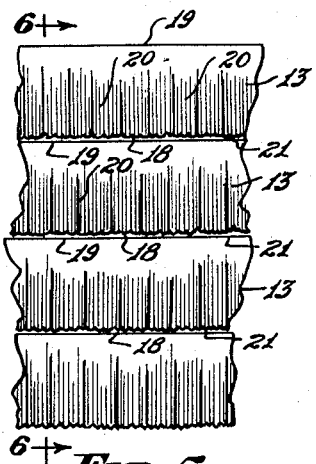
FIG. 5.
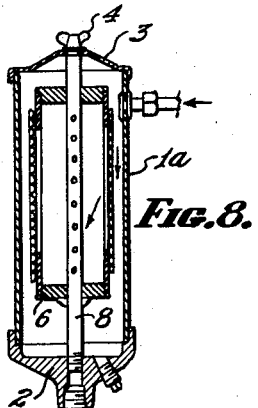
FIG. 8.
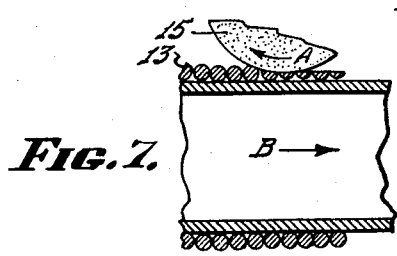
FIG. 7.
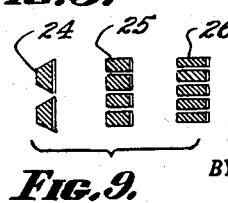
FIG. 9.
INVENTOR.
THOMAS G. BRUNSMAN,
BY
ATTORNEYS.

Nov. 3, 1959 — T. G. BRUNSMAN — 2,911,100
CLOG PROOF FILTER
Filed Oct. 17, 1956 — 2 Sheets-Sheet 2
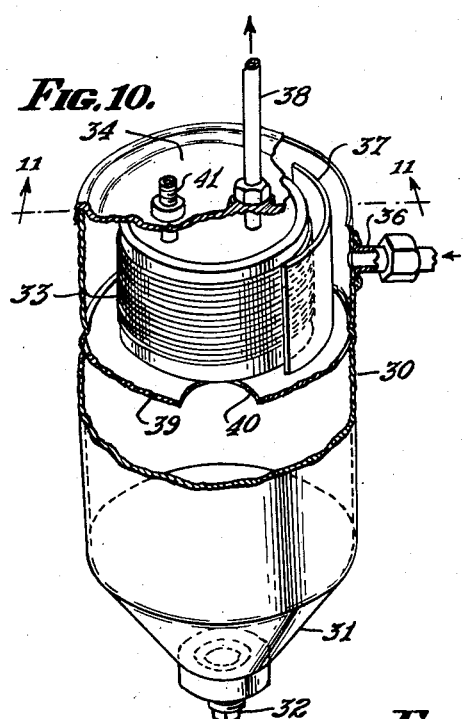
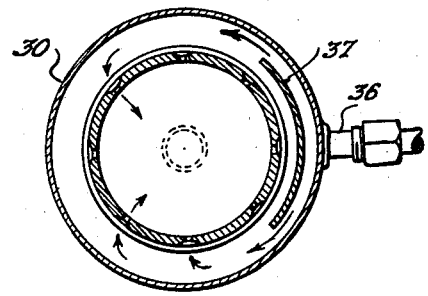
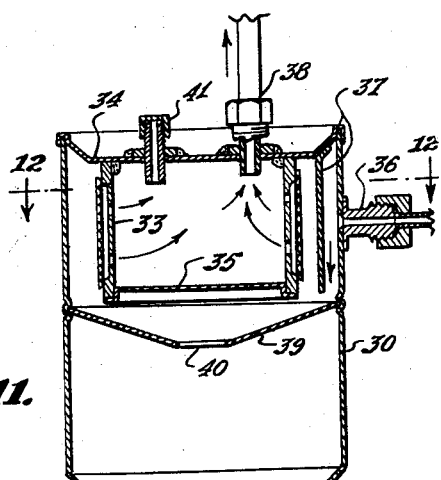
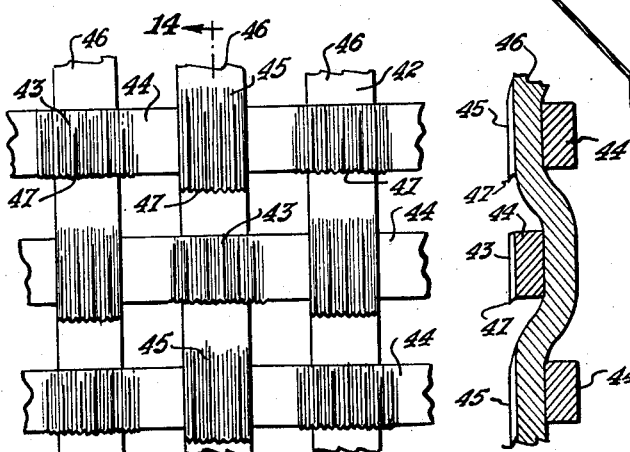
INVENTOR.
THOMAS G. BRUNSMAN,
BY Allen & Allen
ATTORNEYS.

United States Patent Office 2,911,100
Patented Nov. 3, 1959

2,911,100

CLOG PROOF FILTER

Thomas G. Brunsman, Cincinnati, Ohio

Application October 17, 1956, Serial No. 616,535

7 Claims. (Cl. 210—299)

My invention relates to filters and more particularly to the so-called edge-type fluid filter capable of removing exceedingly small particles of dirt or other foreign material from fluids.

In the formation of edge-type filters it has hitherto been proposed to form the filter element from a coil of wire wrapped around a hollow core member and machined smooth on one side to provide sharp edges between the turns of the coil. As initially wrapped, the turns of the coil may touch each other so that, upon machining off of the wire to a plane at its vertical center line, extremely fine filtering slots are provided. The edges of the machined wire are of knife-like character and immediately beyond the knife edges the slots formed between adjacent convolutions widen, thereby permitting any foreign body which passes between the knife or filtering edges to be readily flushed away due to the widening of the slots. By reason of this construction a filter so formed has far less tendency to become clogged.

While edge-type filters of the character described constituted a marked improvement over the sieve and strainer types of filters previously employed, I have now discovered that the filtering action of the edge-type filter can be greatly improved by departing from the fundamental theory of the clog proof knife-edge construction and providing a filtering element which, in contract to prior concepts, is purposely designed to partially clog on its intake side, the collected particles themselves being utilized as a filtering medium effective to collect and retain additional particles. Yet the construction of my filter is such that there is no appreciable build-up of insoluble material on the filter element which would impair its efficiency.

In accordance with my invention, I provide a filter element formed by wrapping wire about a core element to form a coil, but instead of machining the coil smooth to provide knife edges, I grind down or mill the coil in such fashion as to provide a myriad of minute teeth extending along the edges of the convoluted wire and at the same provide grooves extending transversely of the toothed edges. With this arrangement insoluble material, such as dirt particles, will be caught and retained by the teeth with some build up of collected material in the adjoining grooves. However, the oil or other fluid being filtered exerts a washing action as it flows along the filter element and in the grooves effective to carry away excessive deposits of insoluble material built up around the teeth. The grooves, which are arranged to extend in the direction of flow of the fluid, serve to prevent excessive clogging of the filter element and yet the desired partially clogged condition of the filter slots is maintained.

I have found that the desired tooth and groove construction can be obtained by milling or grinding the coil of wire in a direction parallel to the axis of the core, i.e. crosswise or laterally of the convolutions, preferably using a grinding wheel containing relatively coarse abrasives. When the coil is milled or ground in this manner, I have discovered that as the convolutions are cut, they tend to twist or roll forwardly to some degree and more metal is cut from the leading or forward edge of the convolution than from the rear edge. Furthermore, this front or leading edge tends to remain substantially straight, that is, it forms a knife edge, whereas the trailing edge takes on the toothed configuration. Then, when the pressure of the cutting tool is released, the slightly twisted convolutions spring back to their original positions and a shuttered or louvered effect is produced with the toothed edges of the convolutions projecting outwardly beyond the opposed straight or knife-edges of the convolutions. While this effect is of minute proportions, it is nevertheless visible under a magnifying glass and can be detected by running the fingers along the filter element first in one direction and then in the other. It is by reason of this construction that the desired partial clogging of the filter element is obtained which in turn results in the super fine filtering of the oil or other liquid passed through the filter element.

In accordance with the foregoing, it is a principal object of my invention to provide an improved filtering device for oil and other liquid which is particularly adapted to remove insoluble material from the lubricating oil in the crankcases of internal combustion engines where carbon and other contaminating materials are present.

A further object of my invention is the provision of a filtering element formed from a series of windings of wire, or rings, or bars, which constitute the filtering screen, the screen forming material being suitably wrapped around or placed individually on a housing or frame which is properly slotted, drilled or otherwise configured for the passage of oil or other liquid therethrough, the assembly so formed being milled or ground transversely of the screen forming elements to provide the desired tooth and groove configuration.

Yet a further object of my invention is the provision of a procedure for constructing and finishing filter elements of the character described which results in a super fine filtering action.

The foregoing, together with other objects of my invention which will appear hereinafter or which will be apparent to the skilled worker in the art upon reading these specifications, I accomplish by that construction and arrangement of parts of which I shall now describe certain exemplary embodiments.

Reference is made to the accompanying drawings wherein:

Figure 1 is a vertical sectional view illustrating a filtering device for an internal combustion engine incorporating my invention.

Figure 2 is a large fragmentary sectional view taken along the line 2—2 of Figure 1.

Figure 2a is a fragmentary sectional view similar to Figure 2 illustrating an alternative construction.

Figure 3 is a fragmentary vertical sectional view taken along the line 3—3 of Figure 2.

Figure 4 is a perspective view with parts broken away of a filtering element in accordance with my invention.

Figure 5 is an enlarged fragmentary view illustrating the surface characteristics of adjoining convolutions of wire finished in accordance with my invention.

Figure 6 is a vertical sectional view taken along the line 6—6 of Figure 5.

Figure 7 is a vertical sectional view illustrating the manner in which the wire convolutions are ground or milled in accordance with my invention.

Figure 8 is a vertical sectional view similar to Figure 1 illustrating the modified form of filtering device.

Figure 9 is a sectional view illustrating alternative shapes for the wire or bar elements forming the filtering screen.

Figure 10 is a perspective view with parts broken away of a modified form of filter unit.

Figure 11 is a vertical sectional view through the device of Figure 10.

Figure 12 is a sectional view taken along the line 12—12 of Figure 11.

Figure 13 is a highly magnified fragmentary plan view of a filter screen finished in accordance with my invention.

Figure 14 is a sectional view taken along the line 14—14 of Figure 13.

Referring first to Figure 1 of the drawings, I have therein illustrated a filter for an internal combustion engine comprising a body 1 terminating at its lower end in a sludge receiving cup 2 and at its upper end in a removable cap 3 held in place by a wing nut 4. Oil to be filtered is introduced into the filtering device through an inlet opening 5 near the upper end of the body element, whereupon the oil passes through the filtering element, indicated generally at 6, which is centrally disposed with respect to the body 1 and projects upwardly from the cup 2 to which it is fixedly secured. The filtered oil is discharged through an outlet opening 7 in communication with the inside of the filtering element, and in a preferred embodiment a discharge tube 8 having perforations 9 therein projects upwardly within the filtering element from the outlet or discharge opening 7. The arrangement just described is conventional in oil filters for automobile engines and the only material change contemplated by my invention lies in the filtering element 6. It will be understood, however, that my improved filtering element is such that it may be readily substituted for the filtering element employed in present-day automobile oil filters and may readily serve as a replacement for the known type of replaceable cartridge filter element.

In accordance with my invention, the filtering element is composed of a hollow core or tubular sleeve 10 which, as best seen in Figures 3 and 4, is provided with one or more longitudinally extending channels or grooves having a series of perforations 12 therein. A coil of wire 13 of any required diameter is wrapped around the core 10 and secured at its ends to the core in any suitable manner such as by soldering each convolution to the core or, as illustrated, by soldering or otherwise securing the ends only to the core, as at 14. Preferably, the coil is wrapped so that the convolutions touch each other, as will be clearly apparent from the drawings, although where a coarser filtering element is desired, the coil may be wrapped so that the convolutions lie in spaced apart relation.

Subsequent to the wrapping of the coil, the coil will be milled or ground to substantially half-round condition. This operation is diagrammatically illustrated in Figure 7 wherein a grinding wheel is illustrated at 15, the wheel turning in the direction of the arrow A with the filtering element moving in the direction of the arrow B. In accordance with my invention, it is necessary that the grinding or milling operation occur in a direction which substantially traverses the convolutions of the coil 13. The cutting operation is thus completely opposite to the type of machining operation employed in the formation of a conventional edge-type filter wherein the core member and coil are rotated at high speeds and the cutting effected along the convolutions rather than crosswise thereof. The milling or cutting operation which I employ nevertheless encompasses the entire outer surface of the coil, which may be accomplished by rotating the core and coil slightly with each pass of the milling tool or grinder therealong, thereby bringing each convolution of the wire to the substantially half-round condition. Alternatively, as seen in Figure 2a, the coil 13 may be cut so as to provide flats 16 interdigitated with full or partial rounds 17. The flats may lie opposite the recesses 11 with the full round portions overlying uninterrupted areas of the core.

Where the coil is milled or ground in accordance with my invention, I have found that the convolutions of the coil twist or roll forward very slightly with the result that more metal is milled off the leading or forward edge of each convolution than is cut from the rear or trailing edge. This results in the provision of irregular teeth 18 (Figure 5) extending along the trailing edges of the convolutions, whereas the leading edges 19 remain substantially straight in the form of a knife edge in Figure 5. In addition, the cutting operation produces numerous grooves or channels 20 in the cut surfaces of the convolutions, the grooves extending substantially transversely of the convolutions and hence lengthwise of the filter elements. It is these grooves together with the minute teeth produced by the cutting operation which coact to produce the desired partial clogging of the fine line filter slots or passageways 21 lying between adjacent convolutions.

As indicated hereinbefore, the grinding or milling of the wire results in a slight twist or forward roll of the wire which causes more metal to be cut from the leading than from the trailing edges of the convolution. But, when the pressure of the cutting tool is relieved, the resiliency of the convoluted wire causes it to return to substantially its original position and this creates a shuttered or louvered effect with the toothed edges 18 projecting outwardly slightly beyond the smooth or straight edges 19, as will be clearly apparent from Figure 6 of the drawings.

With the arrangement just described, I find that the filter screen does not become excessively clogged with debris or foreign matter and yet the teeth overhanging the smooth edges will cause sufficient foreign matter to cling thereto so as to collect additional particles as they flow toward the filtering slots. While partial clogging of the filtering element is thus obtained, excessive build-up of foreign matter is prevented by the grooves or channels 20 which, as the oil flows downwardly along the outer surface of the filtering element and in the grooves, exert a washing action in the area of the teeth effective to displace and carry away excessive deposits of foreign material collected about the teeth. In this connection, it will be understood that the oil introduced into the body of the filter through the inlet opening 5 will tend to flow downwardly about the sides of the filter element.

In the event a more concentrated washing action is desired, as where unusually dirty oil is encountered, the filter element may be enclosed in a hood, such as the hood 22 seen in Figure 1, the hood being positioned in closely spaced relation to the filtering element and closed at its top so as to cause the oil to flow downwardly in a concentrated stream. Where a hood is employed, a connection 23 will be employed to conduct the incoming oil from the inlet opening 5 to the inside of the hood. The hood will, of course, be open at its bottom so that any excess oil and foreign matter may flow downwardly therebeyond. Alternatively, as illustrated in Figure 8, the filter body itself can be made to more closely approach the walls of the filtering element. Thus, as seen in Figure 8, the outer casing or body 1a of the filter lies in closely spaced relationship with respect to the coil of the filter element, thereby again causing an intensified washing action.

Referring now to Figure 10 of the drawings, I have therein illustrated a filter having a cylindrical body 30 terminating at its lower end in a conical bottom member 31 provided with a drain plug 32. The filter element 33 may be conveniently suspended from the top member or cap 34 which is crimped or otherwise permanently secured to the upper edge of the cylindrical body 30. It will be understood that the filter element 33 will be constructed in the manner hereinbefore described although, in this embodiment, the filter element is closed across its lower end by a plate 35. Preferably, the filter element will be confined to the upper half of the cylindrical body in substantially the manner illustrated. Oil to be filtered is introduced through an inlet connection 36, the oil upon entering the cylindrical body being diffused about the walls thereof by means of a baffle 37 which, as will be clear from Figures 10 and 12, extends a short distance to each side of the inlet opening, thereby causing the incoming oil to flow in the direction indicated by the arrows. The oil, upon passing through the filter element, will be removed from the device through the outlet 38 opening upwardly through the top of the unit.

Spaced somewhat below the filter element 33, I provide a dish-shaped or downwardly inclined baffle 39 having an opening 40 at the center thereof through which sludge and the like may be directed into the lower portion of the cylindrical body and collected for subsequent removal. It will be remembered that as the oil flows about the filtering element, a cleansing action will result causing particles of dirt and the like collected on the filtering element to be washed away. The lower portion of the device may be conveniently cleaned by removing the drain plug 32. To facilitate the removal of the sludge as well as the cleansing of the filtering element, the device may be provided with a cleaning opening 41 arranged to open into the inside of the filtering element. Compressed air or other fluid under pressure may be introduced through the opening 41 to back-wash the filter element, if so desired.

Additional modifications may, of course, be made in my invention without departing from the spirit of it. For example, while I have described my invention as it applies to a generally cylindrical filtering element, it will be apparent that the coil may be formed on a conical core if so desired. Similarly, I have already indicated that the filter screening may be formed from bar or rod stock supported by a suitable frame. While I prefer to use round wire as the screen forming material, other shapes may be employed. Thus, in Figure 9, I have illustrated screen forming material 24 which is of truncated triangular configuration in cross section, material 25 which is of square cross section, and material 26 which is of rectangular cross section. It will be understood, of course, that with any of these materials the grinding or milling operation will be performed as before. It is also within the spirit of my invention to utilize a square mesh screen as a filter element. As seen in Figures 13 and 14, a fine mesh screen 42 may be contacted by a grinding wheel to produce grooves 43 in the laterally extending elements 44 and similar grooves 45 in the longitudinally extending elements 46, the grinding producing teeth or serrations 47 at the trailing edges of the grooves. As before, the toothed configuration effects a partial clogging of the filter screen and to that extent enhances the filtering action.

Having thus described my invention in certain exemplary embodiments, what I desire to protect and secure by Letters Patent is:

1. A filter element comprising an apertured core, a coil of wire secured around said core and covering the apertures therein, the convolutions of said coil defining filtering slots therebetween said coil having its outer surface cut away to provide a relatively flat outer surface, the convolutions of said coil each having a relatively smooth side edge and an opposed toothed side edge, the said convolutions being arranged with the toothed side edges thereof adjoining the smooth side edge of the next adjacent convolution, and grooves in the relatively flat outer surfaces of the convolutions extending generally normal to the said side edges thereof.

2. A filter element comprising an apertured hollow core, a coil of wire secured around said core and covering the apertures therein, the adjoining side edges of adjacent convolutions of said coil defining filtering slots therebetween, said coil having its outer surface cut away to provide convolutions which are substantially half-round in cross section with the flat surfaces thereof outermost, each of said convolutions having a relatively smooth side edge and an opposed toothed side edge, the said convolutions being disposed with the toothed side edges thereof adjoining the smooth side edges of the next adjacent convolution, with the flat outer surfaces of said convolutions tilted slightly with respect to each other so that the toothed edges thereof project outwardly beyond the straight edges of the next adjacent convolutions, and grooves in the outer surface of the convolutions extending generally normal to the said side edges thereof.

3. In an edge-type filter, a filter screen formed by juxtaposing a plurality of rod-like elements in side-by-side relation, the adjoining side edges of adjacent rod-like elements defining filtering slots therebetween, said rod-like elements each having a relatively straight side edge and an irregular side edge consisting of a multiplicity of minute, irregular teeth, the said elements being disposed with the irregular side edges thereof adjoining the smooth side edge of the next adjacent element.

4. In an edge-type filter, a filter screen formed by juxtaposing a plurality of rod-like elements in side-by-side relation, the adjoining side edges of adjacent rod-like elements defining a filtering slot therebetween, the side edge of one of said adjacent rod-like elements being relatively straight and the adjoining side edge of the other of said adjacent rod-like elements being irregular and of generally toothed configuration, and a multiplicity of thin, shallow grooves in the outer surfaces of said rod-like elements extending laterally with respect to said filtering slots.

5. In an edge-type filter, a filter screen formed by juxtaposing a plurality of rod-like elements in side-by-side relation, the adjoining side edge portions of adjacent rod-like elements defining a filtering slot therebetween, the side edge of one of said adjacent rod-like elements being relatively straight and the adjoining side edge of the other of said adjacent rod-like elements being irregular and of generally toothed configuration, and grooves in the outer surfaces of said rod-like elements extending laterally with respect to said filtering slot, the said rod-like elements being tilted slightly with respect to each other so that the toothed edges thereof project outwardly beyond the said straight edges of the adjoining elements.

6. A filter element comprising a coil of wire in which filtering slots are defined by the adjoining side edges of adjacent convolutions making up the coil, said coil having its outer surface removed to provide convolutions of generally half-round configuration with the flat sides thereof outermost, the flat surfaces of said convolutions being inclined with respect to the longitudinal axis of said coil to provide a louvered filtering surface, said convolutions each having a relatively smooth side edge and a toothed side edge composed of a multiplicity of minute, irregular teeth, with the toothed edges of the convolutions over-hanging the straight edges of adjacent convolutions.

7. The filter element claimed in claim 6 wherein the outer surfaces of said convolutions are serrated in a direction substantially normal to the side edges thereof.

References Cited in the file of this patent

UNITED STATES PATENTS

| 408,487 | Jewell | Aug. 6, 1889 |
| 765,182 | King | July 19, 1904 |
| 892,660 | Getty | July 7, 1908 |
| 1,763,996 | Willers | June 17, 1930 |
| 2,046,458 | Johnson | July 7, 1936 |
| 2,068,282 | Strindberg | Jan. 19, 1937 |
| 2,100,266 | Perry | Nov. 23, 1937 |
| 2,652,927 | Komline | Sept. 22, 1953 |
| 2,699,260 | Komline | Jan. 11, 1955 |
| 2,711,253 | Mills | June 21, 1955 |
| 2,754,002 | Gretzinger | July 10, 1956 |
| 2,785,804 | Fernandez | Mar. 19, 1957 |

FOREIGN PATENTS

| 922,154 | France | Jan. 27, 1947 |